April 24, 1956     H. P. OWEN     2,742,942
BLEND OF POLYCHLOROPRENE AND ACRYLIC SYNTHETIC
RUBBERS FOR ADHERING ACRYLIC
RUBBERS TO OTHER MATERIALS
Filed May 29, 1952
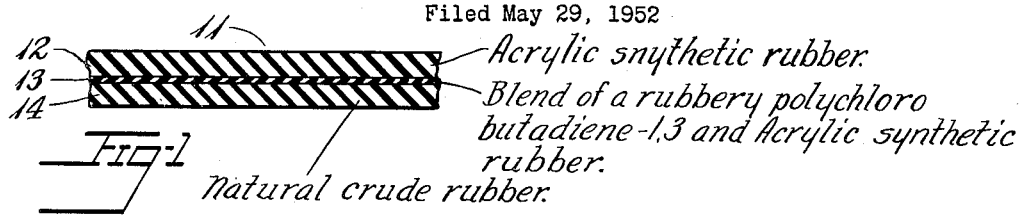
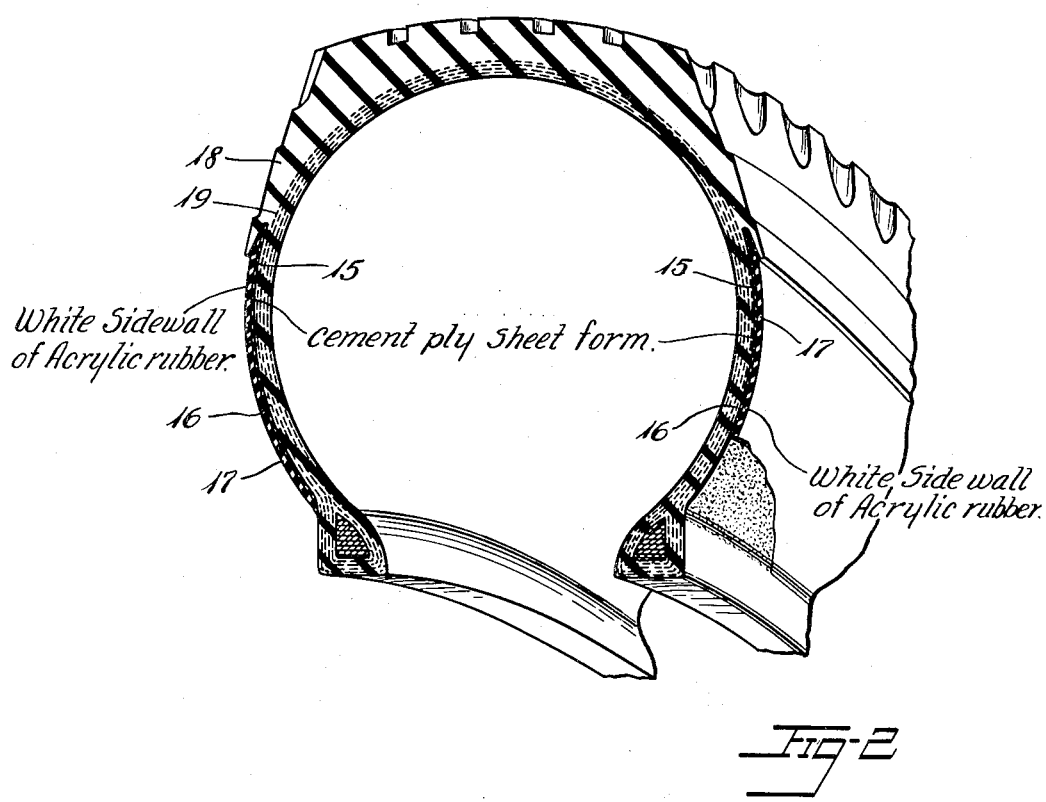
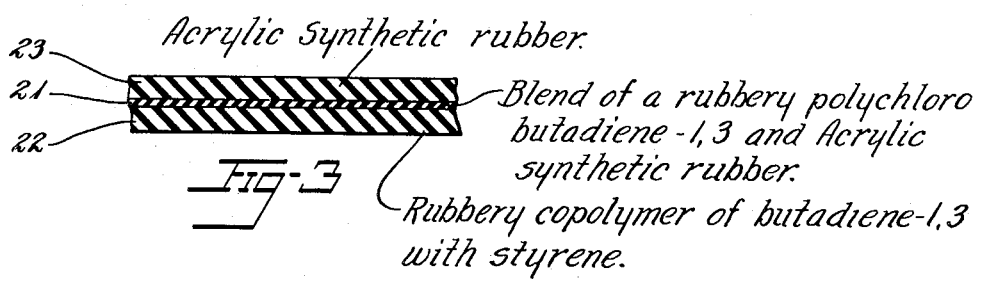
Inventor
Harold P. Owen
By Robert W. Furlong
Atty.

United States Patent Office 2,742,942
Patented Apr. 24, 1956

2,742,942

BLEND OF POLYCHLOROPRENE AND ACRYLIC SYNTHETIC RUBBERS FOR ADHERING ACRYLIC RUBBERS TO OTHER MATERIALS

Harold P. Owen, Fort Worth, Tex., assignor to The B. F. Goodrich Company, New York, N. Y., a corporation of New York Application May 29, 1952, Serial No. 290,754

16 Claims. (Cl. 152—330)

This invention relates to adhesive compositions for adhering rubbery compositions to each other or to filamentary materials and to methods of using such adhesives in the building of composite articles of rubbery materials, such as tires and the like.

It is an object of this invention to provide liquid or solid adhesive compositions which may be used for adhering rubbery materials.

Another object of this invention is to provide an adhesive for adhering polyacrylic rubbery materials to metal and metal coated with primers such as chlorinated rubbers and phenolic resins.

It is a further object to provide an adhesive for adhering polyacrylic synthetic rubbers to other rubbery materials and filamentary materials.

It is also an object to provide an adhesive for treating a filamentary material which may be used as an interposed layer between layers of rubbery materials which are adhered together, and especially between a layer of polyacrylic synthetic rubber and a layer of any other rubbery material.

Other objects will be apparent from the description which follows.

These objects are accomplished by preparing an adhesive comprising a homogeneous blend of two or more rubbery materials and preferably a blend of polyacrylic synthetic rubber with neoprene. This blend may be mixed with any conventional vulcanizing, accelerating and reinforcing ingredients to form a solid adhesive composition which may be used in that condition or may be dissolved in any suitable solvent to form a liquid cement. By interposing such an adhesive composition between a polyacrylic synthetic rubber and another rubbery material or a filamentary material, then vulcanizing the composite product, a good bond is achieved between the materials.

The neoprene blended with the polyacrylic synthetic rubber is a rubbery polymer of chlorobutadiene-1,3, commonly known as polychloroprene or rubbery polymers of 2,3-dichlorobutadiene-1,3 or rubbery copolymers of a chlorobutadiene-1,3 with monomers copolymerizable therewith, such as isoprene, butadiene-1,3, styrene, acrylonitrile, etc. The typical neoprenes are known to the trade as "Neoprene GN", "Neoprene KN", "Neoprene I", "GR–M", and "GR–M–10". The rubbery homopolymer of chloroprene itself is preferred for the purpose of this invention.

The polyacrylic synthetic rubbers included in this invention are prepared by the polymerization of an acrylic acid ester or mixtures of acrylic acid esters in bulk or mass polymerization of the monomers or by the polymerization of the monomers in aqueous emulsions, and the copolymerization of acrylic acid esters with about 5 to 10 per cent by weight of a chlorine containing monomer such as chloroethyl vinyl ether in mass or aqueous emulsion polymerizations. Specific acrylic acid esters include among others ethyl acrylate, methylacrylate, butyl acrylate, methyl methacrylate and methyl ethacrylate. These acrylic synthetic rubbers are known to the art.

It is well known that it is difficult to obtain satisfactory adhesion between acrylic synthetic rubbers and other American-made or natural crude rubbers. Cements such as a phenolic base cement known as Plastilock 602 and a superpolyamide base cement known as Perlon Base cements have been employed to bond such rubbery materials, but do not produce a satisfactory bond where the rubbery material to which the acrylic synthetic rubbers are to be bonded is uncured or unvulcanized and is later vulcanized or cured. However, with the adhesives of this invention, good adhesion is made possible when these adhesives are applied to uncured but curable acrylic synthetic rubbers and vulcanizable compositions containing as the rubbery material natural crude rubber or GR–S (rubbery copolymers of butadiene-1,3 with styrene) or any of the rubbery conjugated diene polymers and copolymers known as American-made rubbers without the necessity of prevulcanizing or precuring any one of the rubbery materials before adhesion. These rubbers can be adhered one to the other simply by placing one of the adhesive compositions of this invention between the unvulcanized rubbery layers and then vulcanizing the composite structure by the application of heat and pressure.

One embodiment of my invention is shown in the drawing in which

Fig. 1 is a fragmentary view in section of a composite structure embodying this invention suitable for use in a pneumatic tire, as a white side wall;

Fig. 2 is a fragmentary perspective view, broken away in section of a pneumatic tire casing embodying the white side wall of Fig. 1; and Fig. 3 is a fragmentary view in section of another embodiment of my invention.

As shown in Fig. 1 of the drawing, a composite structure 11 is constructed from a layer of acrylic synthetic rubber 12 bonded by an adhesive composition 13 to a layer of natural crude rubber 14. Layers 12, 13 and 14 include the usual compounding and curing ingredients. The composition of these layers is described in more detail in the examples which follow.

The tire casing shown in Fig. 2 is constructed in the usual manner up to the application of the side wall material. At this point an adhesive strip 15 such as described in Example 1 is applied to the last carcass ply 16 and the white side wall of acrylic synthetic rubber 17 is applied to the adhesive strip 15. Then tread 18 is added. The complete assembly is then vulcanized by heating under pressure in a mold in the usual manner. In such a construction the last carcass ply 16 is a layer of cotton cord fabric 19 which is coated or impregnated with the rubbery material employed in the carcass stock.

Another embodiment of my invention is shown in Fig. 3 in which a layer 21 of adhesive such as described in Example 2 is interposed between layer 22 of a vulcanizable rubbery composition containing a copolymer of butadiene-1,3 with styrene and a layer 23 of an acrylic synthetic rubber. Such a composite article can be cured and vulcanized in a press between heated platens such as employed to vulcanize flat belts. In this way, a flat belt such as employed as a conveyor belt in the food industry can be constructed with a white food contacting layer which could be subjected to ultraviolet or infrared light without reducing the life of this surface.

It is, of course, apparent that the acrylic synthetic rubber layer need not contain white pigments, for any pigmenting materials commonly used in the art can be utilized to prepare a surface of the desired color. The color pigments do not affect the bond obtained by the adhesive between the acrylic rubber and the other rubber.

The preparation of a typical adhesive composition within the scope of this invention is described in the following specific examples. In these examples, the term "parts" is employed to indicate parts by weight.

EXAMPLE 1

The following ingredients were thoroughly mixed together on a roll mill.

*Composition A.—A white Neoprene GN stock*

| | Parts |
|---|---|
| Neoprene GN (polychloroprene) | 100 |
| Zinc oxide | 70 |
| Stearic acid | 0.5 |
| Plasticizer | 50.0 |
| Calcined magnesia | 2.0 |
| Zinc salt of mercaptobenzothiazole | 0.2 |
| Ultramarine blue | 0.15 |

*Composition B*

| | Parts |
|---|---|
| Rubbery copolymer of 95% ethyl acrylate and 5% chloroethyl vinyl ether | 100 |
| Zinc oxide | 20 |
| Titanium dioxide | 55 |
| Stearic acid | 2.0 |
| High melting synthetic wax | 1.0 |
| Triethylene tetramine | 2.0 |
| Ultramine blue | 0.15 |

Each of the above two compositions were sheeted off at a thickness of 0.04 inch.

Then 50 parts of Composition A and 50 parts of Composition B were blended on a roll mill to complete the preparation of an adhesive of this invention. The composite adhesive was sheeted off the mill 0.02 inch thick. Several 6 inch x 6 inch sheets were cut from the remainder of Composition B. One of these 6 x 6 sheets of Composition B was placed on a 6 x 6 sheet of vulcanizable compisition containing a rubbery copolymer of butadiene-1,3 with styrene compounded as a tire carcass composition, placed in a mold cavity and cured for 30 minutes at 292° F. at approximately 500 pounds per square inch. The resulting vulcanizates were removed from the mold and cooled. There was no adhesion between the two layers. But when a 6 x 6 sheet of the adhesive mixture of Compositions A and B described above was placed between a 6 x 6 sheet of the unvulcanized carcass stock and an uncured 6 x 6 sheet of Composition B and heated in a mold under the same conditions, the resulting layers were bonded together exceedingly well. In fact on testing, the outer layers gave way before the bond failed.

EXAMPLE 2

Two white acrylic synthetic rubber compositions were prepared employing as the acrylic rubber a copolymer of 95 per cent ethyl arcrylate and 5 per cent chloroethyl vinyl ether by mixing on a roll mill the following ingredients in the proportions indicated:

*Composition C*

| | Parts |
|---|---|
| Acrylic synthetic rubber | 100 |
| Titanium dioxide | 30 |
| Silicon oxide | 25 |
| Stearic acid | 2.0 |
| Triethyl trimethylene triamine | 5.0 |
| Plasticizer | None |

*Composition D*

| | Parts |
|---|---|
| Acrylic synthetic rubber | 100 |
| Titanium dioxide | 30 |
| Silicon oxide | 25 |
| Stearic acid | 2.0 |
| Triethyl trimethylene and triamine | 5.0 |
| Plasticizer | 1.0 |

Portions of these white acrylic rubber compositions were blended on a roll mill with a white Neoprene GN stock prepared by milling together the ingredients of the compounding recipe suggested in The Vanderbilt Handbook, 1948 edition, at page 127, together with 54 parts of titanium dioxide and 38 parts of whiting to prepare adhesives of this invention. The proportions of these composites used together with the resulting ratio of Neoprene GN to acrylic rubber are tabulated in Table 1.

TABLE 1.—BLEND OF ACRYLIC RUBBER AND NEOPRENE AS AN ADHESIVE

| | Adhesive II | Adhesive III | Adhesive IV | Adhesive V |
|---|---|---|---|---|
| | Parts | Parts | Parts | Parts |
| Composition C | 63.89 | | 77.3 | |
| Neoprene GN Composition | 100.0 | | 100.0 | |
| Ratio of acrylic rubber to neoprene | 43.5 to 56.5 | | 18.2 to 81.8 | |
| Composition D | | 66.7 | | 37 |
| Neoprene GN Composition | | 100.0 | | 100 |
| Ratio of acrylic rubber to neoprene | | 42.5 to 57.5 | | 29 to 71 |

EXAMPLES 3 TO 5

Three groups of sandwiches containing a layer of acrylic rubber composition of Example 2, a layer of an adhesive composition of Example 2, and a layer of another rubber composition were prepared from unvulcanized compositions. Each of these sandwiches was placed in a mold cavity and cured at 292° F. for 30 minutes at 500 pounds per square inch pressure. The specific compositions employed for each layer together with the evaluation of the adhesive of the layers after curing is tabulated below:

| | Acrylic Rubber layer | Adhesive layer | Third layer | Adhesion |
|---|---|---|---|---|
| Example 3 | Composition C | Adhesive II | GR-S Carcass [1] | Excellent. |
| Example 4 | Composition D | Adhesive III | GR-S Carcass [1] | Do. |
| Example 5 | Composition D | Adhesive V | Natural Rubber [1] | Good. |

[1] Prepared by employing Passenger Carcass recipes found in Vanderbilt's Handbook, 1948 Edition, page 158, titled "Natural Rubber, Non-Reclaim, Nonblack" and "GR-S, Non-Reclaim."

The bonds in the above three examples again were stronger than the outer layers of vulcanizates.

The adhesive of this invention has been found to be of particular value in the manufacture of white sidewall tires. The white pigmented acrylic synthetic rubbers are known to possess unusually high resistance to light and to flex cracking. However, because of the inability heretofore in obtaining satisfactory adhesion of the acrylic synthetic rubbers to the rubbery materials commonly used in tire carcasses, the use of the acrylic synthetic rubbers for this application has been prohibited.

The adhesives of this invention have overcome this construction problem and provide a much superior rubbery material for the preparation of white side wall tires where the excellent physical and chemical properties of the arcylic synthetic rubbers can be advantageously employed.

Results similar to those hereinbefore described can be obtained by the use of the adhesive composition of this invention for bonding acrylic synthetic rubbers to other rubbery conjugated diene polymeric materials such as rubbery polymers of butadiene-1,3 isoprene, piperylene, 2,3-dimethyl butadiene-1,3, chloro butadiene-1,3, and the like; or with rubbery copolymers made by copolymerizing any of these materials with each other or with other copolymerizable ethylenic monomers as well as the rubbery materials resulting from the copolymerization of olefins and diolefins such as the "Butyl" rubbers.

The relative proportions of acrylic synthetic rubbery material and rubbery polychloroprene in the adhesive mixture may be varied over a wide range from about 80 parts to from 20 to 80 parts by weight. However, the best results are obtained where the proportions of rubbery polychloroprene to the acrylic synthetic rubber are from about 70 to 50 parts to from 30 to 50 parts by weight. Pigmentation of the adhesive is not essential but curing agents for the neoprene and the acrylic synthetic rubber such as zinc oxide and a polyalkylene polyamine respectively provide a stronger adhesive. Of course, other compounding ingredients can be added to prepare a colored and/or reinforced adhesive layer. Also, tackifying resins in proportions of 0.5 to 10 parts by weight can be added to improve the building tack of the uncured adhesive. Such resins may be hard cumar, rosin, pine tar, coal tar pitch, or the like.

The adhesives of this invention can be prepared as a cement by dissolving the blend in suitable solvents or mixtures of solvents such as a mixture containing methylethylketone and gasoline or toluene ethyl acetate. These cements can be further enhanced by the addition of hexamethylene diisocyanate, para-phenylene diisocyanate, a rescorcinol formaldehyde resin, or other similar materials.

Further modifications may be effected within the spirit and scope of the invention as defined in the appended claims.

I claim:

1. A vulcanized pneumatic tire having in combination a carcass comprising natural rubber and a sidewall comprising a rubbery acrylic acid ester copolymer secured thereto by means of an interposed bonding layer comprising a homogenous mixture containing as essential adhesive ingredients from about 70 to 50 parts by weight of a rubbery polymer of a chlorobutadiene-1,3 and from 30 to 50 parts by weight of a rubbery acrylic acid ester copolymer, said acrylic acid ester copolymer in said sidewall and in said bonding layer comprising ethyl acrylate and from about 5 to 10% by weight of chloroethyl vinyl ether.

2. A vulcanized pneumatic tire having in combination a carcass comprising a rubbery butadiene-1,3-styrene copolymer and a sidewall comprising a rubbery acrylic acid ester copolymer secured thereto by means of an interposed bonding layer comprising as essential adhesive ingredients from about 70 to 50 parts by weight of a rubbery polymer of a chlorobutadiene-1,3 and from 30 to 50 parts by weight of a rubbery acrylic acid ester copolymer, said acrylic acid ester copolymer in said sidewall and in said bonding layer comprising ethyl acrylate and from about 5 to 10% by weight of chloroethyl vinyl ether.

3. A composite structure comprising a layer of rubbery acrylic acid ester polymer and a layer of an adhesive composition comprising as essential adhesive ingredients from about 80 to 20 parts by weight of a rubbery polymer of a chloro-butadiene-1,3 and from 20 to 80 parts by weight of a rubbery acrylic acid ester polymer, said acrylic acid ester polymer in each of said layers being selected from the group consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula

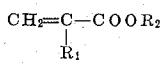

where $R_1$ is selected from the class consisting of hydrogen and the lower molecular weight alkyl radicals and $R_2$ is a lower molecular weight alkyl radical.

4. A composite structure comprising a first layer of a rubbery conjugated diene polymer material, a second layer of rubbery acrylic acid ester polymer, and an interposed layer of an adhesive composition comprising as essential adhesive ingredients from about 80 to 20 parts by weight of a rubbery polymer of a chloro-butadiene-1,3 and from 20 to 80 parts by weight of a rubbery acrylic acid ester polymer, said acrylic acid ester polymer in said second layer and in said interposed layer of adhesive being selected from the group consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula

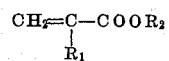

wherein $R_1$ is selected from the class consisting of hydrogen and the lower molecular weight alkyl radicals and $R_2$ is a lower molecular weight alkyl radical.

5. A composite structure comprising a first layer of sulfur-vulcanizable rubbery material, a second layer of rubbery acrylic acid ester polymer, and an interposed layer of an adhesive composition comprising as essential adhesive ingredients from about 70 to 50 parts by weight of a rubbery polymer of a chlorobutadiene-1,3 and from 30 to 50 parts by weight of a rubbery acrylic acid ester polymer, said acrylic acid ester polymer in said second layer and in said interposed layer of adhesive being selected from the group consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula

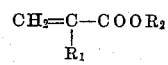

where $R_1$ is selected from the class consisting of hydrogen and the lower molecular weight alkyl radicals and $R_2$ is a lower molecular weight alkyl radical.

6. A flexible, composite structure comprising a first layer of natural rubber, a second layer of rubber acrylic acid ester polymer, and an interposed layer of an adhesive composition comprising as essential adhesive ingredients from about 70 to 50 parts by weight of a rubbery polymer of a chlorobutadiene-1,3 and from 30 to 50 parts by weight of a rubbery acrylic acid ester polymer, said acrylic acid ester polymer in said second layer and in said interposed layer of adhesive being selected from the group consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula

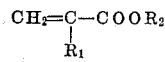

where $R_1$ is selected from the class consisting of hydrogen and the lower molecular weight alkyl radicals and $R_2$ is a lower molecular weight alkyl radical.

7. A composite structure comprising a first layer of a rubbery copolymer of butadiene-1,3 with styrene, a second layer of rubbery acrylic acid ester polymer, and an interposed layer of an adhesive composition comprising as essential adhesive ingredients from about 70 to 50 parts by weight of a rubbery polymer of a chlorobutadiene-1,3 and from 30 to 50 parts by weight of a rubbery acrylic acid ester polymer, said acrylic acid polymer in said second layer and in said interposed layer of adhesive being selected from the group consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula

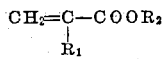

where $R_1$ is selected from the class consisting of hydrogen and the lower molecular weight alkyl radicals and $R_2$ is a lower molecular weight alkyl radical.

8. A method of adhering a rubbery conjugated diene polymeric material to a rubbery acrylic acid ester polymer comprising interposing between layers of said rubbery material and said polymer a layer of a heat-vulcanizable composition which comprises as essential adhesive ingredients from about 80 to 20 parts by weight of a rubbery polymer of a chlorobutadiene-1,3 and from 20 to 80 parts by weight of a rubbery acrylic acid ester polymer, said acrylic acid ester polymer in said acrylic polymer layer and in said interposed layer being selected from the group consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula

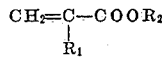

where $R_1$ is selected from the class consisting of hydrogen and the lower molecular weight alkyl radicals and $R_2$ is a lower molecular weight alkyl radical, and heating the composite product to vulvanize the rubbery constituents.

9. A method of adhering natural rubber to a rubbery acrylic acid ester polymer comprising interposing between layers of said rubber and said polymer a layer of a heat-vulcanizable composition which comprises as essential adhesive ingredients from about 70 to 50 parts by weight of a rubbery polymer of a chlorobutadiene-1,3 and from 30 to 50 parts by weight of a rubbery acrylic acid ester polymer, said acrylic acid ester polymer in said polymer layer and in said interposed layer of adhesive being selected from the group consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula

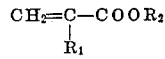

where $R_1$ is selected from the class consisting of hydrogen and the lower molecular weight alkyl radicals and $R_2$ is a lower molecular weight alkyl radical, and heating the composite product to vulcanize the rubbery constituents.

10. A method of adhering a rubbery copolymer of butadiene-1,3 with styrene to a rubbery acrylic acid ester polymer comprising interposing between layers of said rubbery copolymer and said rubbery polymer a layer of a heat-vulcanizable composition which comprises as essential adhesive ingredients from about 70 to 50 parts by weight of a rubbery polymer of a chlorobutadiene-1,3 and from 30 to 50 parts by weight of a rubbery acrylic acid ester polymer, said acrylic acid ester polymer in said acrylic polymer layer and in said interposed layer of adhesive being selected from the group consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula

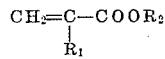

where $R_1$ is selected from the class consisting of hydrogen and the lower molecular weight alkyl radicals and $R_2$ is a lower molecular weight alkyl radical, and heating the composite product to vulcanize the rubbery constituents.

11. A vulcanized pneumatic tire having in combination a carcass comprising a sulfur-vulcanized rubbery material and a side-wall secured thereto, said sidewall comprising a rubbery acrylic acid ester polymer and a bonding layer interposed between said side-wall and said carcass, said bonding layer comprising a homogeneous mixture containing as essential adhesive ingredients from about 70 to 50 parts by weight of a rubbery polymer of a chlorobutadiene-1,3 and from 30 to 50 parts by weight of a rubbery acrylic acid ester polymer, said acrylic acid ester polymer in said sidewall and in said bonding layer being selected from the group consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula

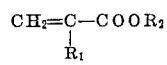

where $R_1$ is selected from the class consisting of hydrogen and the lower molecular weight alkyl radicals and $R_2$ is a lower molecular weight alkyl radical.

12. A vulcanized pneumatic tire having in combination a carcass comprising a sulfur-vulcanized rubbery material and a sidewall integral therewith, said sidewall comprising a rubbery acrylic acid ester polymer and a bonding layer securing said sidewall to said carcass, said bonding layer comprising a homogeneous mixture containing as the essential adhesive ingredients from about 80 to 20 parts by weight of a rubbery polymer of chlorobutadiene-1,3 and from 20 to 80 parts by weight of a rubbery acrylic acid ester polymer, said acrylic acid ester polymer in said sidewall and in said bonding layer being selected from the group consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula

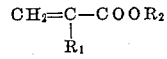

where $R_1$ is selected from the class consisting of hydrogen and the lower molecular weight alkyl radicals and $R_2$ is a lower molecular weight alkyl radical.

13. A composite structure comprising a layer of sulfur-vulcanizable rubbery material, a layer of rubbery acrylic acid ester polymer selected from the group consisting of a rubbery homopolymer of an acrylic acid ester, a rubbery copolymer of a mixture consisting essentially of acrylic acid esters and a rubbery copolymer of a mixture consisting essentially of a major amount of an acrylic acid ester and a minor amount of chloroethyl vinyl ether and an interposed layer of an adhesive composition comprising as essential adhesive ingredients from about 70 to 50 parts by weight of a rubbery homopolychlorobutadiene-1,3 and from 30 to 50 parts by weight of a rubbery copolymer consisting essentially of from about 5 to 10% by weight of chloroethyl vinyl ether and the balance ethyl acrylate.

14. A composite vulcanized structure comprising a layer of a rubbery acrylic acid ester polymer and a layer of a composition comprising as the essential adhesive ingredients from about 80 to 20 parts by weight of a rubbery polymer of a chlorobutadiene-1,3 and from 20 to 80 parts by weight of a rubbery acrylic acid ester polymer, said acrylic acid ester polymer in each of said layers being selected from the class consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula $$CH_2=C-COOR_2$$
$$\quad |$$
$$\quad R_1$$

where $R_1$ is selected from the class consisting of hydrogen and the lower molecular weight alkyl radicals and $R_2$ is a lower molecular weight alkyl radical.

15. A composite vulcanized structure comprising a first layer of a rubbery conjugated diene polymeric material, a second layer of a rubbery acrylic acid ester polymer, and an interposed layer of an adhesive composition comprising as essential adhesive ingredients from about 80 to 20 parts by weight of a rubbery polymer of a chlorobutadiene-1,3 and from 20 to 80 parts by weight of a rubbery acrylic acid ester polymer, said acrylic acid ester polymer in said second layer and in said interposed layer of adhesive being selected from the group consisting of a rubbery homopolymer of an acrylic acid ester, a rubbery copolymer of a mixture consisting essentially of acrylic acid esters and a rubbery copolymer of a mixture consisting essentially of a major amount of an acrylic acid ester and a minor amount of chloroethyl vinyl ether, said acrylic acid ester having the formula $$CH_2=C-COOR_2$$
$$\quad |$$
$$\quad R_1$$

where $R_1$ is selected from the class consisting of hydrogen and the lower molecular weight alkyl radicals and $R_2$ is a lower molecular weight alkyl radical.

16. A composite vulcanized structure comprising a first layer of sulfur-vulcanizable rubbery material, a second layer of rubbery acrylic acid ester polymer, and an interposed layer of an adhesive composition comprising as essential adhesive ingredients from about 70 to 50 parts by weight of a rubbery polymer of a chlorobutadiene-1,3 and from 30 to 50 parts by weight of a rubbery acrylic acid ester polymer, said acrylic acid ester polymer in said second layer and in said interposed layer of adhesive being selected from the group consisting of a rubbery homopolymer of an acrylic acid ester, a rubbery copolymer of a mixture consisting essentially of acrylic acid esters, and a rubbery copolymer of a mixture consisting essentially of a major amount of an acrylic acid ester and a minor amount of chloroethyl vinyl ether, said acrylic acid ester having the formula $$CH_2=C-COOR_2$$
$$\quad |$$
$$\quad R_1$$

where $R_1$ is selected from the class consisting of hydrogen and the lower molecular weight alkyl radicals and $R_2$ is a lower molecular weight alkyl radical.

References Cited in the file of this patent

UNITED STATES PATENTS

| | | |
|---|---|---|
| 2,209,928 | Nowak | July 30, 1940 |
| 2,356,091 | Roedel | Aug. 15, 1944 |
| 2,393,438 | Weisberg | Jan. 22, 1946 |
| 2,471,456 | Rust | May 31, 1949 |
| 2,471,905 | Smith | May 31, 1949 |
| 2,566,328 | Hessney et al. | Sept. 4, 1951 |
| 2,581,920 | Kuhn | Jan. 8, 1952 |